O. H. TROUT.
Cotton-Planters.
No. 155,903. Patented Oct. 13, 1874.
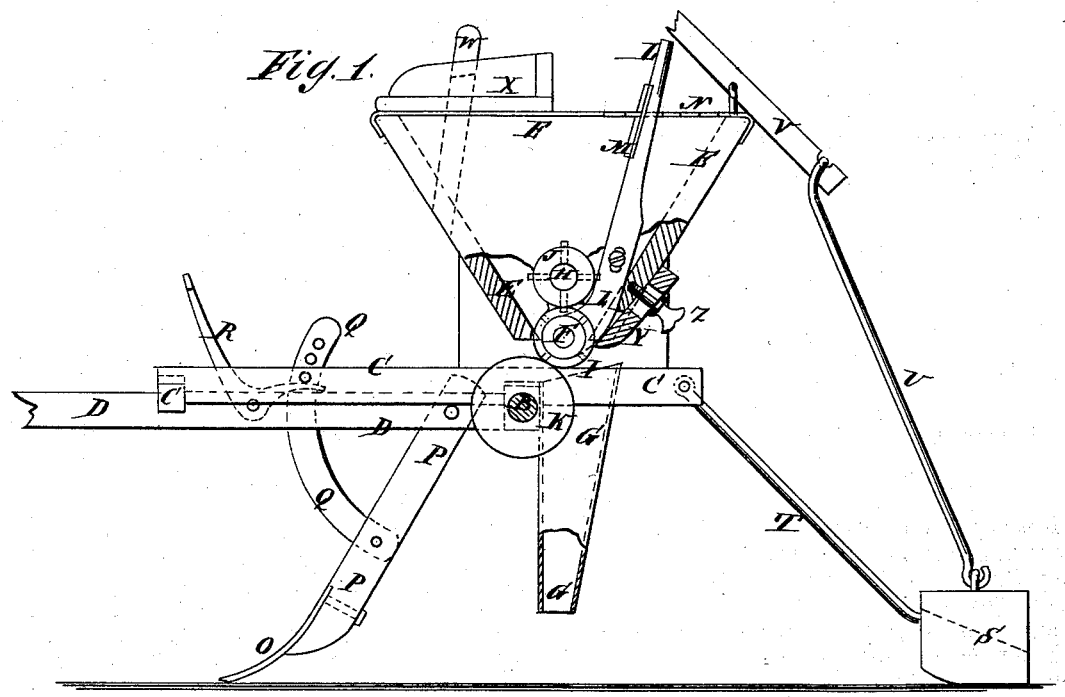
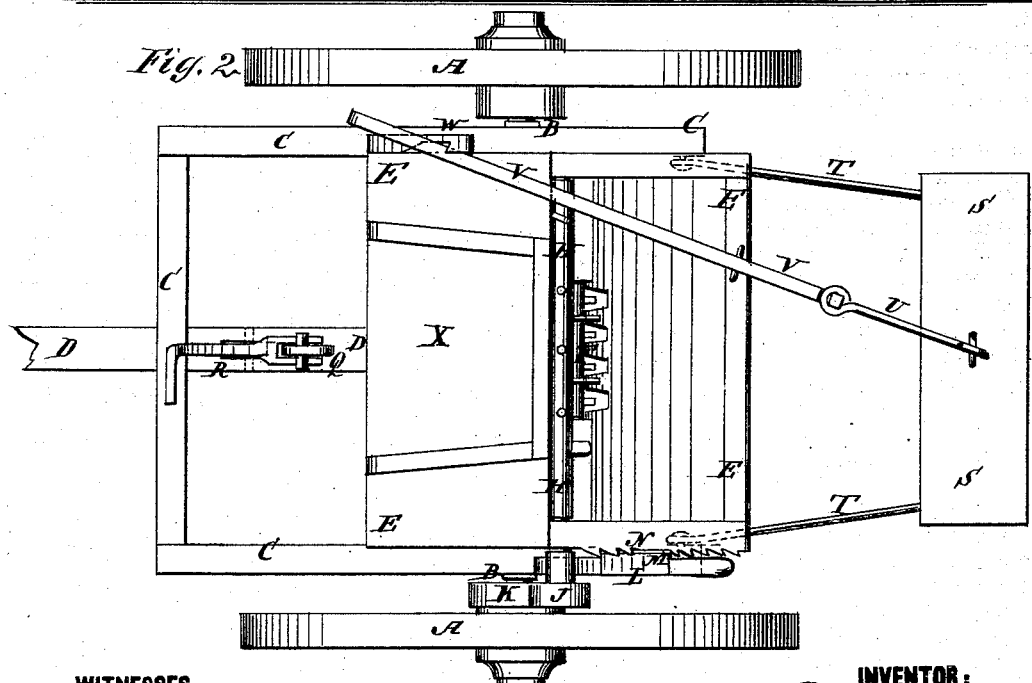
WITNESSES:
E. Wolff
O. Sedgwick
INVENTOR:
O. H. Trout
BY Munn & Co.
ATTORNEYS.

UNITED STATES PATENT OFFICE.

OLIVER H. TROUT, OF HONEY GROVE, TEXAS.

IMPROVEMENT IN COTTON-PLANTERS.

Specification forming part of Letters Patent No. 155,903, dated October 13, 1874; application filed July 25, 1874.

*To all whom it may concern:*

Be it known that I, OLIVER H. TROUT, of Honey Grove, in the county of Fannin and State of Texas, have invented a new and useful Improvement in Cotton-Planter, of which the following is a specification:

The invention relates to the construction and arrangement of means for adjusting the furrow-opener, as hereinafter described.

Figure 1 is a side view of the planter, part being in section. Fig. 2 is a top view of the planter.

A represents the wheels, B the axle, C the frame, D the tongue, E the hopper, and G the spout. F is a toothed feed-shaft; H, the toothed stirrer-shaft, carrying, respectively, friction-wheels I J, which receive motion from the friction-wheel K on the hub of the wheel A. The shaft F is journaled at one end in the lower end of the lever L, so that by operating the said lever the friction-wheel I may be thrown into and out of gear with the wheels J K, as desired. M is a catch-plate for locking the lever L upon a notched plate, N. The covering-block S is connected to the frame C by rods T, and may be raised off the ground by lever V and rod U. W is a catch for the lever V. X is the driver's seat.

I do not claim the claim the construction or combination of the parts above described.

O is the opening-plow, which is attached to the lower end of the standard P, the upper end of which has a tenon formed upon it, which is inserted and pivoted in a slot in the rear end of the tongue D. The draft-strain upon the standard P is sustained by the brace-bar Q, the lower end of which is secured to the standard P. The brace-bar Q is curved and passes through a slot in the tongue D, and has a number of holes formed through its upper part to receive a pin which rests upon the upper side of the tongue D. R is a lever, which is pivoted in a recess in the tongue D. The lower end of the lever R is forked, to receive the upper part of the brace-bar Q, so that its forks may be beneath the pin which passes through said brace-bar. The free end of the lever R projects upward and forward, and is bent to one side to form a rest for the driver's foot, so that the driver, from his seat, can operate the lever R with his foot to raise the opening-plow from the ground, for convenience in passing obstructions, turning, &c.

Having thus described my invention, I claim as new and desire to secure by Letters Patent—

The combination, with the pivoted furrow-opener standard P and curved brace-bar Q, of the elbow-shaped foot-lever R, pivoted at its angles, said parts being applied to the tongue D, as shown and described, for the purpose specified.

OLIVER H. TROUT.

Witnesses:
L. BRYANT,
GEO. A. DAILEY.